Sept. 23, 1924.
H. L. TAYLOR
WINDSHIELD CLEANER
Filed Feb. 21, 1924
1,509,620
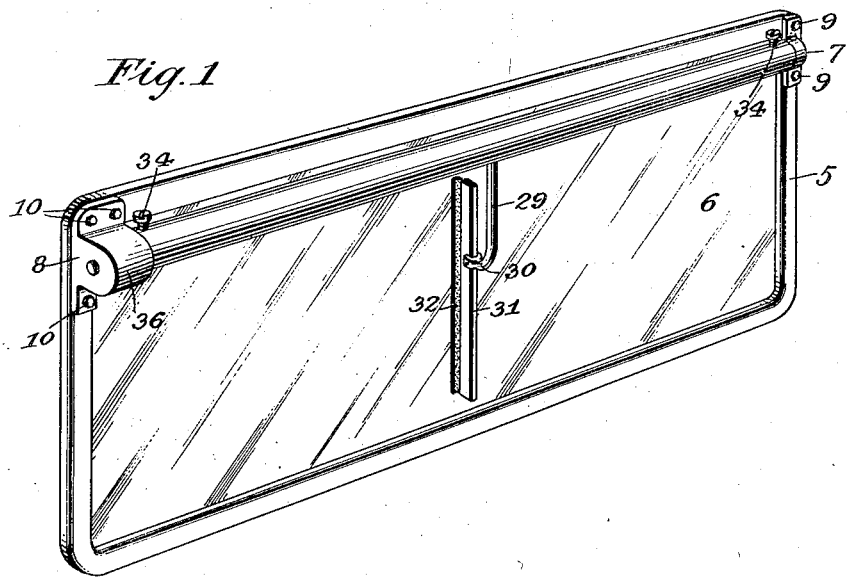
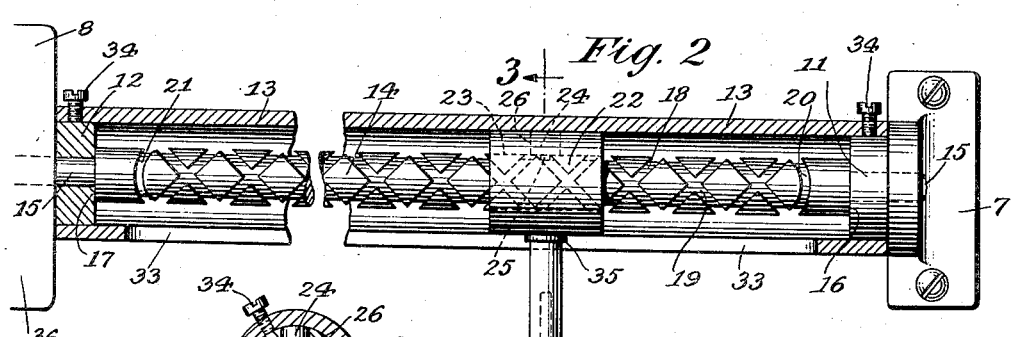
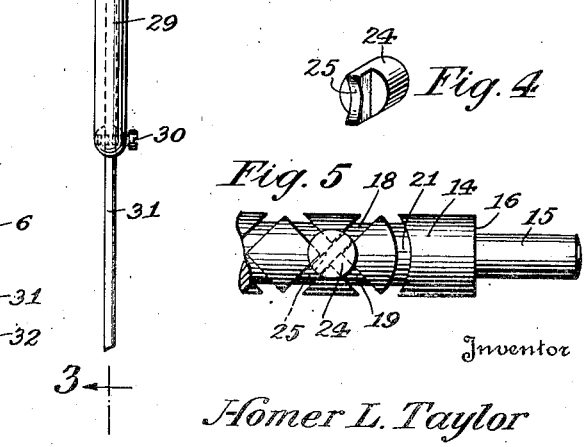
Inventor
Homer L. Taylor
By Chamberlain & Newman
Attorneys

UNITED STATES PATENT OFFICE.

HOMER L. TAYLOR, OF BRIDGEPORT, CONNECTICUT.

WINDSHIELD CLEANER.

Application filed February 21, 1924. Serial No. 694,279.

*To all whom it may concern:*

Be it known that HOMER L. TAYLOR, a citizen of the United States, and resident of Bridgeport, in the county of Fairfield and State of Connecticut, has invented certain new and useful Improvements in Windshield Cleaners, of which the following is a specification.

This invention relates to a wind shield cleaner, and has for an object to provide a novel device of the present nature having a wiper member adapted to be reciprocated linearly across a wind shield glass.

A further object is to provide a wind shield cleaner of the reciprocable wiper member type which will be more simply constructed than other cleaners of the same general type heretofore known and will be an improvement generally upon all of said other wind shield cleaners.

Another object is to provide a wind shield cleaner having a shaft with a continuous groove providing oppositely disposed feed groove portions including a unique arrangement of insuring the reversing of movement of a wiper member in a sure and positive manner, without liability of the wiper member becoming stuck at either extreme of its movement and without any wear or tear whatsoever upon the usual slide or follower adapted to ride in said continuous groove.

And yet another object is to provide in the improved wind shield cleaner a very simple arrangement for adjusting the wiper member toward and away from a wind shield glass, in order that the wiper pad of said member can bear with desired and proper pressure upon said glass during reciprocations of said wiper member.

With the above objects in view, as well as others which will become apparent as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the scope of the appended claims.

In the accompanying drawing forming a part of this specification,

Fig. 1 is a perspective view of the improved wind shield wiper applied to a wind shield frame;

Fig. 2 is an enlarged central longitudinal sectional view thereof;

Fig. 3 is a detail transverse section, taken on line 3—3 of Fig. 2;

Fig. 4 is an enlarged perspective view of the wiper carrier sleeve pin with slide or follower; and Fig. 5 is an enlarged elevational view of a fragment of the wiper shaft with continuous groove.

With respect to the drawing and the numerals of reference thereon, 5 represents a wind shield frame with glass 6.

Of the improved wind shield cleaner, 7 and 8 denote respectively right and left brackets adapted to be secured to the front face of the frame as at 9 and 10, and provided with integral hubs, denoted by 11 and 12, respectively, the hubs of the brackets extending toward each other and being adapted to snugly receive the opposite ends of a housing tube 13 designed to span the complete distance between the brackets and to engage the body of each bracket adjacent its hub.

Numeral 14 denotes a wiper shaft with reduced end portions 15 adapted to be mounted in suitable openings desirably centrally arranged in the brackets 7 and 8, the reduced end portions providing shoulders 16 and 17 adapted to engage the hubs 11 and 12 respectively. See Fig. 2.

Numerals 18 and 19 indicate oppositely disposed groove portions of a continuous groove in the wiper shaft 14 connected at their opposite ends by curved portions denoted 20 and 21, said curve portions as disclosed being spaced but a slight distance from the hubs.

A wiper carrier sleeve 22 arranged upon the wiper shaft 14 has a desirably centrally positioned, longitudinally extending opening 23 freely receiving said shaft. A pin 24 with slide or follower 25 is arranged in a radial hole 26 in said sleeve 22 to be freely rotatable in said hole. The follower 25 is adapted to ride in a feed groove portion 18, 19, or in a return portion 20, 21, as the case may be, and the position of the slide or follower in the hole 26 is insured by engagement of the end of the pin opposite the follower with the housing tube 13. See Fig. 2.

Preferably opposite the pin 24 the carrier sleeve 22 has a threaded hole 27 receiving the threaded end 28 of a wiper arm 29 secured in any suitable manner as at 30 to a wiper bar 31 having a wiper pad 32.

The housing tube 13 is provided opposite the pin 24 with a longitudinal slot 33 allowing free passage of the wiper arm and caring for said arm during reciprocation of the wiper carrier sleeve in a manner to be described.

Numeral 34 represents set screws, one for each hub, arranged in the opposite end portions of the housing tube 13 and adapted to engage said hubs. Clearly, these screws are for the purpose of locating the housing tube to position the longitudinal slot 33 with relation to the wind shield glass so that the wiper pad will exert the desired and proper pressure against said glass during its reciprocation. A roller 35 upon the wiper arm and adapted to engage one side of the slot is to reduce friction as the wiper arm moves in the slot. It is evident that the rear wall of said slot, spaced from the wind shield glass, provides the bearing surface for said wiper arm as it reciprocates.

The shaft 14 may be rotated in any suitable manner, or in either direction, as by means of a motor, indicated generally at 36; or said shaft may be provided with a handle to be rotated manually; or said shaft may be connected by means of a flexible transmitting shaft to an axle of an automotive vehicle.

The oppositely directed feed groove portions 18 and 19 of the continuous groove is of a spiral nature and includes at each end of the shaft curved portions 20 and 21 which insure a reversal of feeding movement of the slide at the end of each reciprocation and further serves to guide it back through the opposite portion of the groove that has its lead directed in the opposite direction and which insures the reversing of movement of the wiper member in a smooth and positive manner.

Evidently, continuous rotation of the wiper shaft 14 in one direction moves the wiper carrier sleeve 22 in one direction longitudinally of said shaft 14 until the pin 24 reaches a curved portion, and then moves said sleeve back in opposite direction the full length of a feed groove portion to the other curved portion. By reversing the direction of rotation of the shaft 14 the wiper pad can, obviously, be made to wipe over any area of the wind shield glass less than the full area as disclosed in Fig. 1, as for example when it is desired to reciprocate the wiper pad over a special area of the glass.

Having thus described my invention, what I claim and desire to secure by Letters Patent is:—

1. A wind shield cleaner comprising spaced apart brackets each having a hub, said hubs extending toward each other, a housing tube having its opposite ends fitted on said hubs, a carrier shaft in said tube and having its opposite ends mounted in said hubs, means for rotating said shaft, oppositely extending feed groove portions on said shaft, a carrier slide adapted to ride in said feed groove portions, a wiper arm with wiper pad carried by said carrier slide and adapted to wipe a wind shield glass, the housing tube having a longitudinal slot allowing passage of said wiper arm, and set screws in the end portions of said housing tube and engaging said hubs, whereby said slot can be given any desired adjustment with respect to the wind shield and the axis of said wiper shaft, for the purpose described.

2. The combination as specified in claim 1, wherein said wiper arm is provided with a roller adapted to engage the wall of said slot spaced opposite a wind shield glass to be wiped.

3. A wind shield cleaner comprising spaced apart brackets each having a hub, said hubs extending toward each other, a housing tube having its opposite ends fitted on said hubs, a carrier shaft in said tube and having its opposite ends mounted in said hubs, means for rotating said shaft, oppositely extending feed groove portions on said shaft, a carrier slide having a pin with follower adapted to ride in said feed groove portions, a wiper arm with wiper pad carried by said follower and adapted to wipe a wind shield glass, the housing tube having a longitudinal slot allowing passage of said wiper arm, said pin lying in a radial hole in said carrier slide and having its position insured by said tube, and said wiper bar being threaded into another hole in said carrier slide.

Signed at Bridgeport, in the county of Fairfield and State of Connecticut, this 15th day of February, A. D. 1924.

HOMER L. TAYLOR.

Witnesses:
LILLIAN GLEDHILL,
ROGER E. PERREGAUX.